Jan. 17, 1950 W. F. HOLIFIELD 2,494,812
COOKING UTENSIL
Filed Oct. 23, 1947
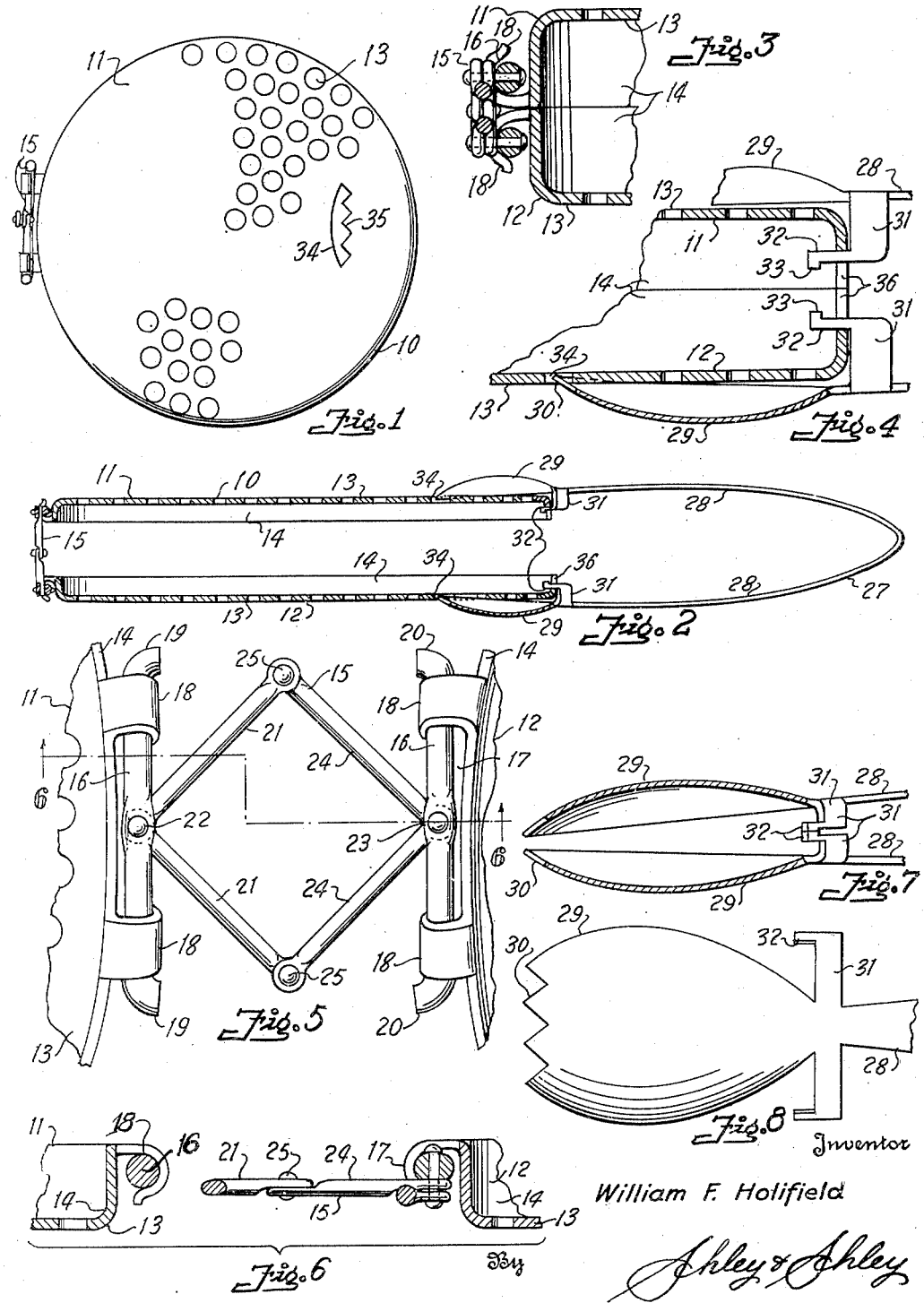
Inventor
William F. Holifield
By Ashley & Ashley
Attorneys Patented Jan. 17, 1950

2,494,812

UNITED STATES PATENT OFFICE 2,494,812

COOKING UTENSIL

William F. Holifield, Amarillo, Tex.

Application October 23, 1947, Serial No. 781,712

2 Claims. (Cl. 99—394)

This invention relates to new and useful improvements in cooking utensils.

One object of the invention is to provide an improved cooking utensil of foraminous or porous construction which is particularly adapted for use in broiling or frying various foods.

Another object of the invention is to provide an improved cooking utensil which includes a foraminous receptacle made in complementary sections for receiving food to be cooked therebetween and connected together in such manner as to facilitate turning of the receptacle, whereby all portions of the food may be thoroughly cooked with a minimum quantity of grease or cooking oil.

A further object of the invention is to provide an improved cooking utensil, of the character described, wherein the sections of the receptacle are connected by an extensible hinge so as to vary the spacing of said sections for accommodating foods of various thickness.

Still another object of the invention is to provide an improved cooking utensil, of the character described, wherein the receptacle sections have openings therein for receiving a turning device whereby the receptacle may be firmly grasped and turned.

A construction designed to carry out the invention will be hereinafter described together with other features of the invention.

The invention will be more readily understood from a reading of the following specification and by reference to the accompanying drawing, wherein an example of the invention is shown, and wherein:

Fig. 1 is a plan view of a cooking utensil, constructed in accordance with the invention, Fig. 2 is a transverse, vertical, sectional view of the cooking utensil, with a turning device engaged therewith, Fig. 3 is a detailed sectional view of the extensible hinge, Fig. 4 is a detailed sectional view of a portion of the utensil, showing the engagement of the turning device therewith, Fig. 5 is an elevational view of the hinge, showing its mounting, Fig. 6 is a sectional view, taken on the line 6—6 of Fig. 5, Fig. 7 is a view, partly in elevation and partly in section, of the head of the turning device, and Fig. 8 is a plan view of the turning device head.

In the drawing, the numeral 10 designates a cooking utensil for frying or broiling foods of various thickness and includes a pair of complementary sections or plates 11 and 12 which are preferably circular in shape. Each plate is formed of thin metal and has a perforated or foraminous, flat bottom 13 with an upset or upstanding, annular flange or lip 14 formed on its margin. Thus, the plates 11 and 12 are substantially dish-like and their flanges 14 are adapted to abut when in overlying alined relation (Figs. 3 and 4). However, the spacing between the plates is adapted to be varied in accordance with the thickness of the food disposed therebetween as shown in Fig. 2.

An extensible or adjustable hinge member 15 pivotally connects the plates to each other so as to permit relative swinging as well as axial movement of said plates. The hinge member 15 includes a pair of hinge pins 16 and 17, each of which is rotatably and externally mounted upon one of the plate flanges 14 by a pair of spaced spring clips or brackets 18 (Figs. 5 and 6). As shown by the numerals 19 and 20, the ends of the hinge pins 16 and 17 are bent upon themselves to prevent displacement of said pins from the clips 18.

A pair of transverse links or members 21 are pivotally connected to each other and to the medial portion of the hinge pin 16 by a suitable rivet or pivot pin 22. The medial portion of the hinge pin 17 carries a similar pivot pin or rivet 23 for connecting a pair of complementary links or members 24 thereto and to each other. Each link 21 has its opposite or free end pivotally connected to the free end of one of the links 24 by a rivet or pivot pin 25, whereby the links coact to provide extensible elements of the lazy tongs type for permitting axial movement of the plates relative to each other so as to vary the spacing therebetween while maintaining the hinge pins in substantially parallel relation. Due to this arrangement, the hinge member is adjustable or extensible but is substantially rigid in that the plates pivot about the pins 16 and 17. If desired, the hinge pins may have their medial portions slightly flattened to receive the links 21 and 24. The ends of the latter are flattened in the customary manner.

Although the cooking utensil and the plates may be lifted by any suitable means, it is preferable to employ a pair of specially constructed tongs 26 which includes a one-piece handle 27 bent upon itself to provide a pair of parallel leg portions 28 (Fig. 3). A dished or spoon-shaped head or bill 29 is formed on the free end of each leg 28 and the extremity of the head is cutoff at a right angle to the axis of said head and notched or serrated to provide alined teeth or serrations 30 (Figs. 7 and 8). Adjacent the head 29, each leg 28 is provided with a cross arm 31 which projects laterally beyond either side of said leg and has its ends bent inwardly upon themselves at right angles. A forwardly-directed extension or hook 33 is formed upon each inwardly-directed arm end and, if desired, each hook may be provided with an enlargement or stop 33 for spacing the teeth 30 of the heads from each other.

As shown in Fig. 1, the bottom 13 of each plate has an arcuate slot or opening 34 formed therein adjacent its margin in diametrically opposed relation to the hinge member 15. The arc or curvature of the slot 34 is reversed with respect to the adjacent curved margin of the plate and its shorter longitudinal edge portion is notched or serrated to provide teeth or serrations 35 for coacting with the teeth 30. As shown in Figs. 2 and 4, the ends of the heads 29 are adapted to be engaged with the slots 34 for turning the utensil as well as lifting or pivoting one of the plates relative to the other. Due to the arcuate disposition of the plate teeth 35, the outermost teeth 30 mesh and engage with the outermost plate teeth. With the heads of the tong legs overlying the plates, the ends of the cross arms 31 are disposed adjacent the marginal flanges 14 of said plates. For receiving the hooks 32, suitable slots or recesses 36 are formed in the plate flanges. Thus, the plates are frictionally gripped between the head and hooks of the tongs to facilitate turning of the utensil.

From the foregoing, it is believed to be readily apparent that a novel form of cooking device or utensil for frying or broiling foods of various thickness has been provided. Due to the lazy tongs arrangement of the hinge member 15, the plates may be disposed in abutting relation for thin foods and may move apart for accommodating thicker foods without objectionable projection of said hinge. In this manner, foods of different thickness are held in a flat position during cooking and can be readily turned without piercing or breaking the external surfaces of said foods. Manifestly, the utensil permits the frying of foods in small quantities of grease or cooking oil due to the ease of turning the same and the flat position of said foods. As has been pointed out, the tongs 27 or other suitable means may be used in turning the utensil. Also, the serrated slots 34 facilitate lifting or pivotal movement of one plate relative to the other inserting and removing food therebetween.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A cooking utensil including a pair of complementary foraminous plates having flat bottoms, an annular marginal flange on each plate adapted to engage each other when the plates are in overlying alined relation, a hinge pin rotatably mounted on each flange, and pairs of links each pair having one end pivotally connected to each other and to each hinge pin, the opposite ends of the links being connected to the corresponding ends of the other pair of links, whereby said plates may be pivoted relative to each other and the spacing therebetween may be varied.

2. A cooking utensil including a pair of complementary plate-like sections, the sections being slightly dished and of foraminous construction, an extensible hinge pivotally connecting said sections and including, a hinge pin rotatably mounted on the margin of each section, and pairs of links, the links of each pair having one end pivotally connected to each other and the hinge pin, the opposite ends of said links being pivotally connected to the corresponding link ends of the other pair, whereby said sections may be pivoted relatively to each other and moved toward and away from each other to accommodate foods of various thickness.

WILLIAM F. HOLIFIELD.

REFERENCES CITED

The following references are of record in the file of this patent:

UNITED STATES PATENTS

| Number | Name | Date |
|---|---|---|
| 414,690 | Eldridge | Nov. 12, 1889 |
| 2,057,501 | Parr | Oct. 13, 1936 |

FOREIGN PATENTS

| Number | Country | Date |
|---|---|---|
| 770,794 | France | Sept. 20, 1934 |